United States Patent

Wang (10) Patent No.: US 9,989,180 B2
(45) Date of Patent: *Jun. 5, 2018

(54) ATTACHMENT FOR AIR VALVE

(71) Applicant: Beto Engineering & Marketing Co., Ltd., Taichung (TW)

(72) Inventor: Lo Pin Wang, Taichung (TW)

(73) Assignee: BETO ENGINEERING & MARKETING CO. LTD., Taichung (TW)

(*) Notice: Subject to any disclaimer, the term of this patent is extended or adjusted under 35 U.S.C. 154(b) by 0 days. days.

This patent is subject to a terminal disclaimer.

(21) Appl. No.: 15/076,990

(22) Filed: Mar. 22, 2016

(65) Prior Publication Data

US 2017/0276278 A1    Sep. 28, 2017

(51) Int. Cl.
| F16K 15/20 | (2006.01) |
| F16L 37/18 | (2006.01) |
| B60S 5/04 | (2006.01) |
| F04B 33/00 | (2006.01) |

(52) U.S. Cl.
CPC .............. *F16L 37/18* (2013.01); *B60S 5/04* (2013.01); *F04B 33/00* (2013.01); *F04B 33/005* (2013.01); *F16K 15/20* (2013.01); *Y10T 137/3724* (2015.04)

(58) Field of Classification Search
CPC ........ F16K 31/602; F16K 11/04; F16K 15/20; F16K 15/207; F16K 1/04; F16K 3/262; F16K 3/267; F16L 37/18; F16L 37/28; B60C 23/10; F04B 33/00; F04B 33/005; B60S 5/04; Y10T 137/2584; Y10T 137/3584; Y10T 137/5196; Y10T 137/5283; Y10T 137/372; Y10T 137/52834; Y10T 137/3724

USPC .................. 137/223, 231; 251/149.6, 149.8; 417/569

See application file for complete search history.

(56) References Cited

U.S. PATENT DOCUMENTS

| 5,645,100 | A | 7/1997 | Chuang |
| 5,683,234 | A | 11/1997 | Chuang et al. |
| 5,749,392 | A | 5/1998 | Glotin |
| 6,105,600 | A | 8/2000 | Wang |
| 6,105,601 | A | 8/2000 | Wang |
| 6,146,116 | A | 11/2000 | Wu et al. |
| 6,289,920 | B1 | 9/2001 | Wang |
| 6,328,057 | B1 | 12/2001 | Wang |
| 7,866,335 | B2 | 1/2011 | Wang |
| 9,206,916 | B1* | 12/2015 | Wang .................... F16K 15/207 |

(Continued)

*Primary Examiner* — Craig J Price
(74) *Attorney, Agent, or Firm* — Che-Yang Chen; Law Offices of Scott Warmuth (57) ABSTRACT

An air valve connecting device or attachment includes a mouth engaged in a housing and having a compartment for engaging with either a US or French inflation valve, a barrel engaged into the housing and engaged onto the mouth, an actuator slidably engaged in the housing and engageable with the barrel, and a cam member is engageable with the actuator for selectively forcing the actuator and the barrel to compress the mouth to grasp either of the inflation valves to the housing, a tube is slidably engaged in the actuator and extendible into the mouth, and a catch is slidably engaged in the actuator and engageable into the actuator for selectively engaging with and for retaining the tube to the actuator.

12 Claims, 8 Drawing Sheets

(56) References Cited

U.S. PATENT DOCUMENTS

| | | | |
|---|---|---|---|
| 9,388,914 B2* | 7/2016 | Wang | F16K 31/602 |
| 2004/0187960 A1* | 9/2004 | Kemppainen | F04B 33/005 |
| | | | 141/383 |
| 2008/0236675 A1* | 10/2008 | Wang | F16K 15/20 |
| | | | 137/231 |
| 2014/0190576 A1* | 7/2014 | Wang | F16K 15/20 |
| | | | 137/231 |

* cited by examiner

ATTACHMENT FOR AIR VALVE

BACKGROUND OF THE INVENTION

1. Field of the Invention

The present invention relates to an air valve connecting head or device or attachment, and more particularly to an air valve connecting device or attachment including an improved structure for easily and quickly connecting to different inflation valves without changing the parts or elements or structure of the air valve connecting attachment.

2. Description of the Prior Art

Typical air valve connecting devices or attachments comprise one or more fitting ports or mouths formed or provided in a valve housing for receiving or engaging with inflation valves or nozzles and for selectively inflating various kinds of balls, inner tires of the bicycles or the motorcycles or the vehicles, or other inflatable articles. Normally, the inflation valves or nozzles may comprise different structures, such as the U.S. type inflation valve or the French type inflation valve, or the like for inflating different tires of the bicycles or the motorcycles or the vehicles.

For example, U.S. Pat. No. 5,683,234 to Chuang et al., U.S. Pat. No. 5,645,100 to Chuang et al., U.S. Pat. No. 5,749,392 to Glotin, U.S. Pat. No. 6,105,600 to Wang, U.S. Pat. No. 6,105,601 to Wang, U.S. Pat. No. 6,146,116 to Wu et al., U.S. Pat. No. 6,289,920 to Wang, U.S. Pat. No. 6,328,057 to Wang, and U.S. Pat. No. 7,866,335 to Wang disclose several of the typical hand operated, dual chambered, pneumatic pumps comprising a fitting member or attachment for selectively or alternatively engaging with different nozzles or tire valves, such as the U.S. type inflation valve or the French type inflation valve, or the like.

However, the typical air valve connecting heads or fittings or attachments comprise a structure that may not be easily operated by the user or may not effectively grasping or holding the different inflation valves, and may have an air leaking problem occurred through either the inflation valve or the attachment.

The present invention has arisen to mitigate and/or obviate the afore-described disadvantages of the conventional air valve connecting devices or attachments.

SUMMARY OF THE INVENTION

The primary objective of the present invention is to provide an air valve connecting device or attachment including an improved structure for easily and quickly connecting to different inflation valves without changing the parts or elements or structure of the air valve connecting attachment.

In accordance with one aspect of the invention, there is provided an air valve connecting device comprising a housing including a chamber formed therein, and including an entrance formed in the housing and communicating with the chamber of the housing for receiving a pressurized air, a grasping mouth engaged in a lower portion of the housing, and including a compartment formed in the mouth for engaging with either a first inflation valve or a second inflation valve, a barrel engaged into the chamber of the housing and engaged onto the mouth, the barrel including a space formed therein and defined by a peripheral wall, an actuator slidably engaged in an upper portion of the housing and engageable with the barrel, and the actuator including a bore formed therein, and including a groove laterally formed in the actuator and communicating with the bore of the actuator, a cam member pivotally attached to the housing and engageable with the actuator for selectively forcing the actuator and the barrel to compress the mouth to grasp either the first inflation valve or the second inflation valve to the housing, a tube slidably engaged in the bore of the actuator for selectively engaging with the second inflation valve, and extendible into the compartment of the mouth for selectively engaging with the first type valve, and at least one catch slidably received and engaged in the groove of the actuator and engageable into the bore of the actuator for selectively engaging with the tube and for selectively retaining the tube to the actuator and to one of the inflation valves.

The peripheral wall of the barrel is provided for selectively engaging with and moving the catch into the bore of the actuator and to engage with the tube when the actuator is moved toward the barrel. The actuator includes a shank having an outer diameter no greater than an inner diameter of the peripheral wall of the barrel for allowing the shank of the actuator to be selectively engaged into the space of the barrel, and for allowing the peripheral wall of the barrel to be selectively engaged with the catch when the actuator is moved toward the barrel.

The actuator includes a spring biasing element engaged with the catch for biasing and moving the catch away from the bore of the actuator when the actuator is disengaged from the peripheral wall of the barrel. The barrel includes a disc slidably engaged into the space of the barrel and having a projection extended from the disc for slidably engaging with the catch and for guiding and limiting the catch to slide relative to the actuator and for preventing the catch from being disengaged from the actuator.

The barrel includes at least one spring biasing member engaged with the disc for biasing the projection of the disc to engage with the catch. The barrel includes a peripheral protrusion extended into the space of the barrel for engaging with and for supporting the spring biasing member. The tube includes a peripheral recess formed in an outer peripheral portion thereof for selectively engaging with the catch. The tube includes two peripheral ribs for forming the peripheral recess between the peripheral ribs of the tube.

The tube includes a cavity formed therein for engaging with a spring biasing member which is engaged between the actuator and the tube for biasing and forcing the tube to move into the compartment of the mouth. The cam member is pivotally attached to the housing with an axle, and the cam member includes a handle extended from the cam member for pivoting the cam member relative to the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
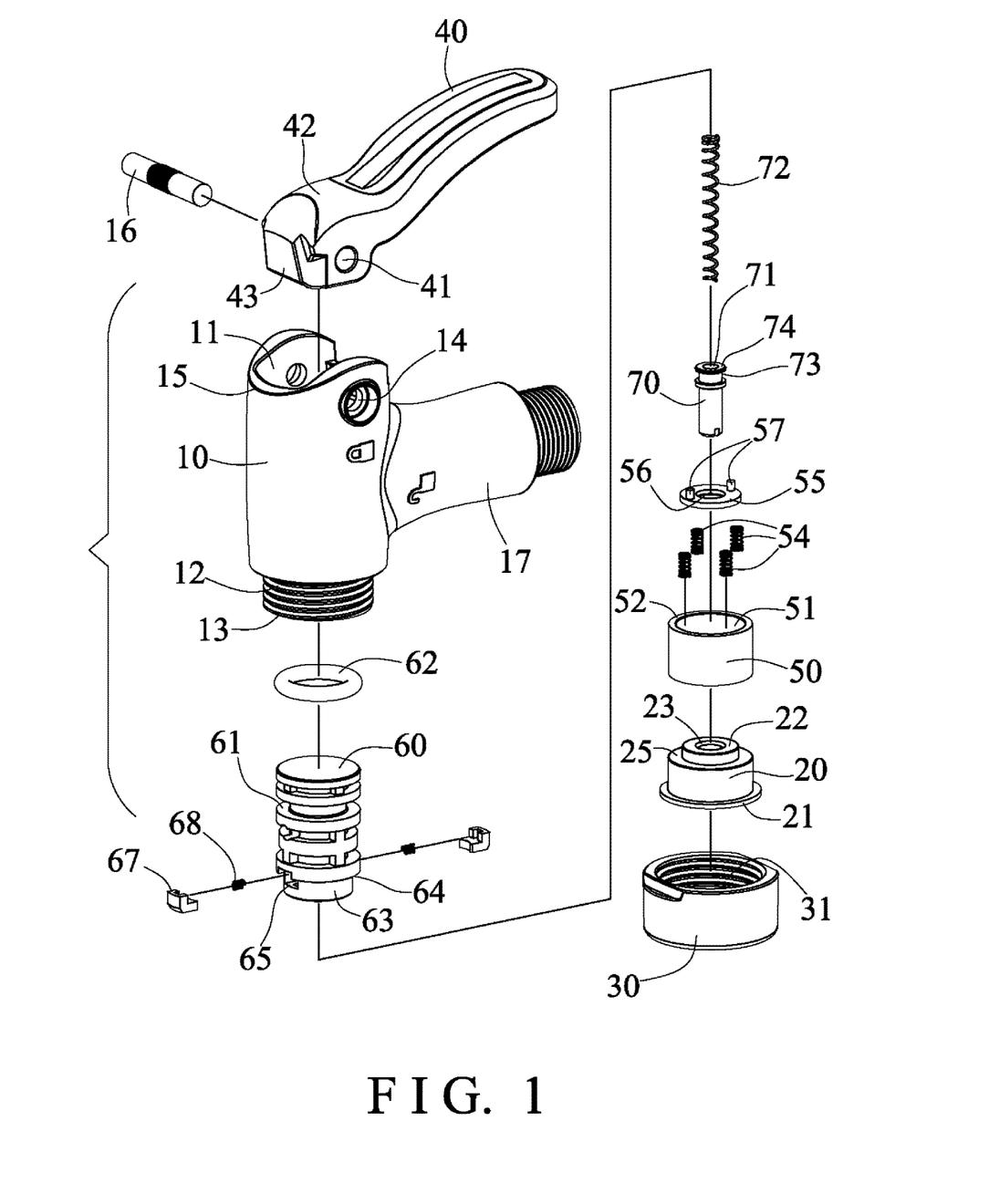
FIG. 1 is an exploded view of an air valve connecting device or attachment in accordance with the present invention.
Figure 2:
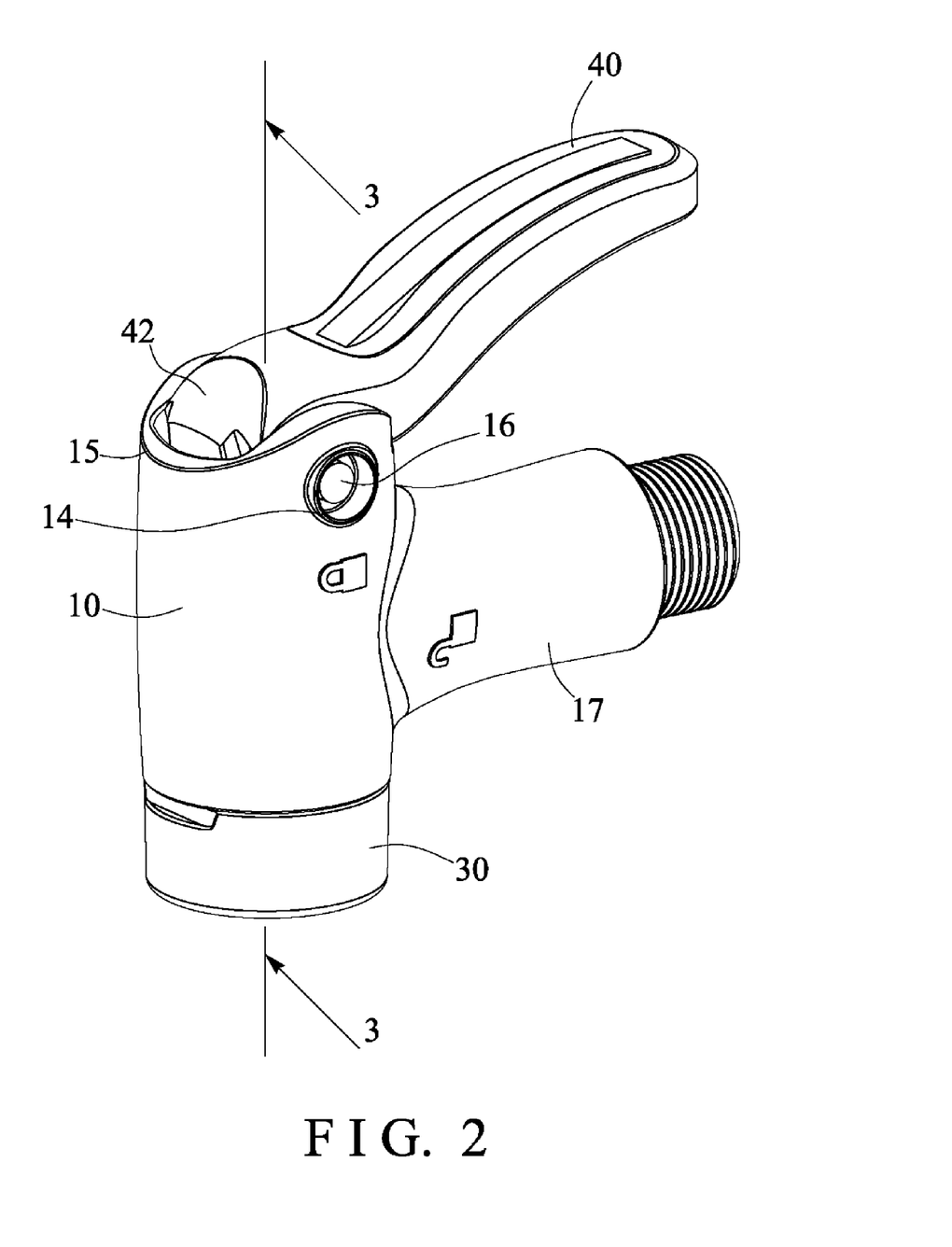
FIG. 2 is a perspective view of the air valve connecting device or attachment.
Figure 3:
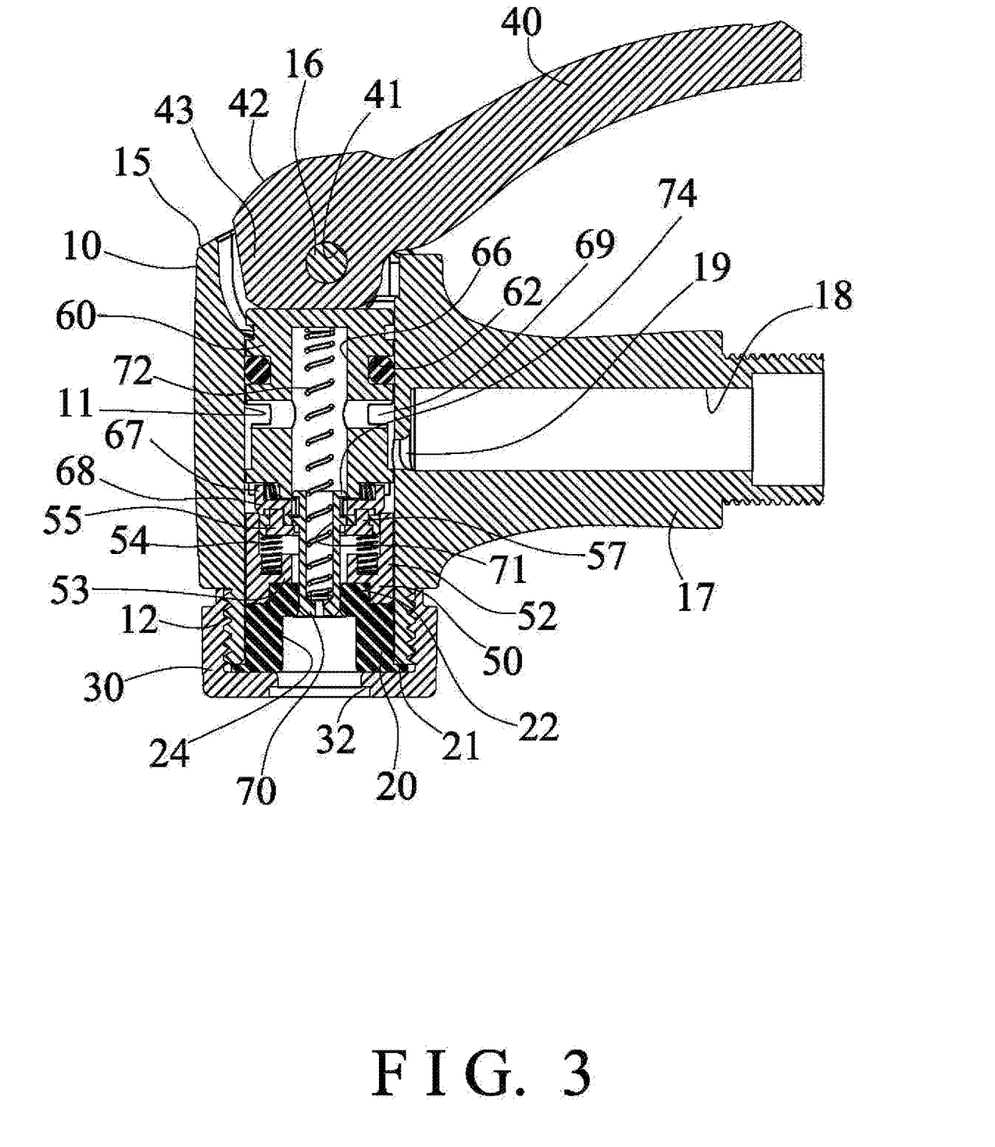
FIG. 3 is a cross sectional view of the air valve connecting device or attachment taken along lines 3-3 of FIG. 2.

Referring to the drawings, and initially to FIGS. 1-3, an air valve connecting device or attachment in accordance with the present invention comprises a head body or outer housing 10 including a chamber 11 formed therein, and including an outer thread 12 formed in the first end or one end or the lower portion 13 thereof, and including a lateral orifice 14 formed therein, such as formed in the other one end or the upper portion 15 of the housing 10 and communicating with the chamber 11 of the housing 10 for receiving or engaging with an axle 16 which is laterally extended through the chamber 11 of the housing 10, and including a cylindrical casing 17 laterally extended from the housing 10 and substantially perpendicular to the housing 10, and including a bore 18 formed in the cylindrical casing 17 for coupling to an air pump (not shown) or the like, and including an entrance 19 formed therein and communicating with the chamber 11 of the housing 10 and the bore 18 of the cylindrical casing 17.

An elastic grasping member or mouth 20 is to be attached or engaged into the one end or the lower portion 13 of the housing 10, and includes a peripheral flange 21 extended laterally and outwardly therefrom for engaging with the lower portion 13 of the housing 10 and for anchoring the mouth 20 to the housing 10 and for preventing the mouth 20 from being completely engaged into the housing 10, and includes a stud 22 extended upwardly from the mouth 20 and having a bore 23 formed in the stud 22, and includes a compartment 24 formed in the mouth 20 (FIG. 3) and having an inner diameter greater than that of the bore 23 of the stud 22. The mouth 20 includes an outer diameter greater than that of the stud 22 for forming an outer peripheral shoulder 25 between the mouth 20 and the stud 22. It is preferable that the mouth 20 is made of soft or elastic materials, such as rubber, plastic or other synthetic materials for resiliently grasping the inflation valves 80, 88, such as the first or U.S. type inflation valve 88 (FIGS. 4-6) and the second or French type inflation valve 80 (FIGS. 7 and 8) to the housing 10 when the mouth 20 is compressed to engage with either of the inflation valves 80, 88.

A cover 30 includes an inner thread 31 formed therein (FIG. 1) for engaging with the outer thread 12 of the housing 10 and for detachably attaching or securing the cover 30 to the housing 10, and the cover 30 may be engaged with the peripheral flange 21 of the mouth 20 for solidly anchoring or securing the mouth 20 to the housing 10. The cover 30 includes an opening 32 formed therein (FIGS. 3-8) and having an inner diameter greater than that of the compartment 24 of the mouth 20 (FIG. 3) for receiving or engaging with the inflation valves 80, 88, and for allowing the inflation valves 80, 88 to be engaged into the compartment 24 of the mouth 20 and/or engaged into the bore 23 of the stud 22 (FIGS. 7, 8), and thus for allowing the inflation valves 80, 88 to be resiliently grasped or held or secured to the housing 10 with the mouth 20 when the mouth 20 is compressed or actuated.

An actuating handle 40 includes an aperture or hole 41 formed therein, such as formed in the one end 42 thereof for receiving or engaging with the axle 16 and for pivotally or rotatably attaching or securing the handle 40 to the housing 10 and for allowing the actuating handle 40 to be rotated relative to the housing 10 to selected angular positions. The handle 40 includes a cam member 43 formed or provided on the one end 42 thereof, or the handle 40 is extended from the cam member 43. A cylindrical grasping member or barrel 50 is further provided and engaged into the chamber 11 of the housing 10 and engaged onto the mouth 20, and includes a compartment or space 51 formed therein and formed or defined by a peripheral wall 52, and includes a peripheral protrusion 53 extended radially and inwardly therefrom and into the space 51 of the barrel 50 for contacting or engaging with the stud 22 of the mouth 20 and for stably anchoring and positioning the barrel 50 to the mouth 20. One or more (such as four) spring biasing members 54 are disposed or engaged into the space 51 of the barrel 50 and contacted or engaged with the peripheral protrusion 53 of the barrel 50, and a plate or partition or disc 55 is slidably disposed or engaged into the space 51 of the barrel 50 and contacted or engaged with the spring biasing members 54 for allowing the disc 55 to be resiliently supported in the barrel 50, and the disc 55 includes an aperture 56 formed therein, and includes one or more (such as two) projections 57 extended upwardly therefrom.

An actuating member or actuator 60 is slidably engaged in the other one end or the upper portion 15 of the housing 10, and includes a peripheral depression 61 formed in the outer peripheral portion thereof for receiving or engaging with a sealing ring 62 and for engaging with the inner peripheral portion of the housing 10 and for making a water tight or air tight seal between the actuator 60 and the housing 10, and includes a shank 63 extended downwardly therefrom for contacting or engaging with the barrel 50, and having an outer diameter smaller than that of the actuator 60 for forming an outer peripheral shoulder 64 between the shank 63 and the actuator 60. The actuator 60 includes a groove 65 laterally formed therein and intersecting or communicating with the bore 66 of the actuator 60 for slidably receiving or engaging with one or more (such as two) catches 67.

Figure 4:
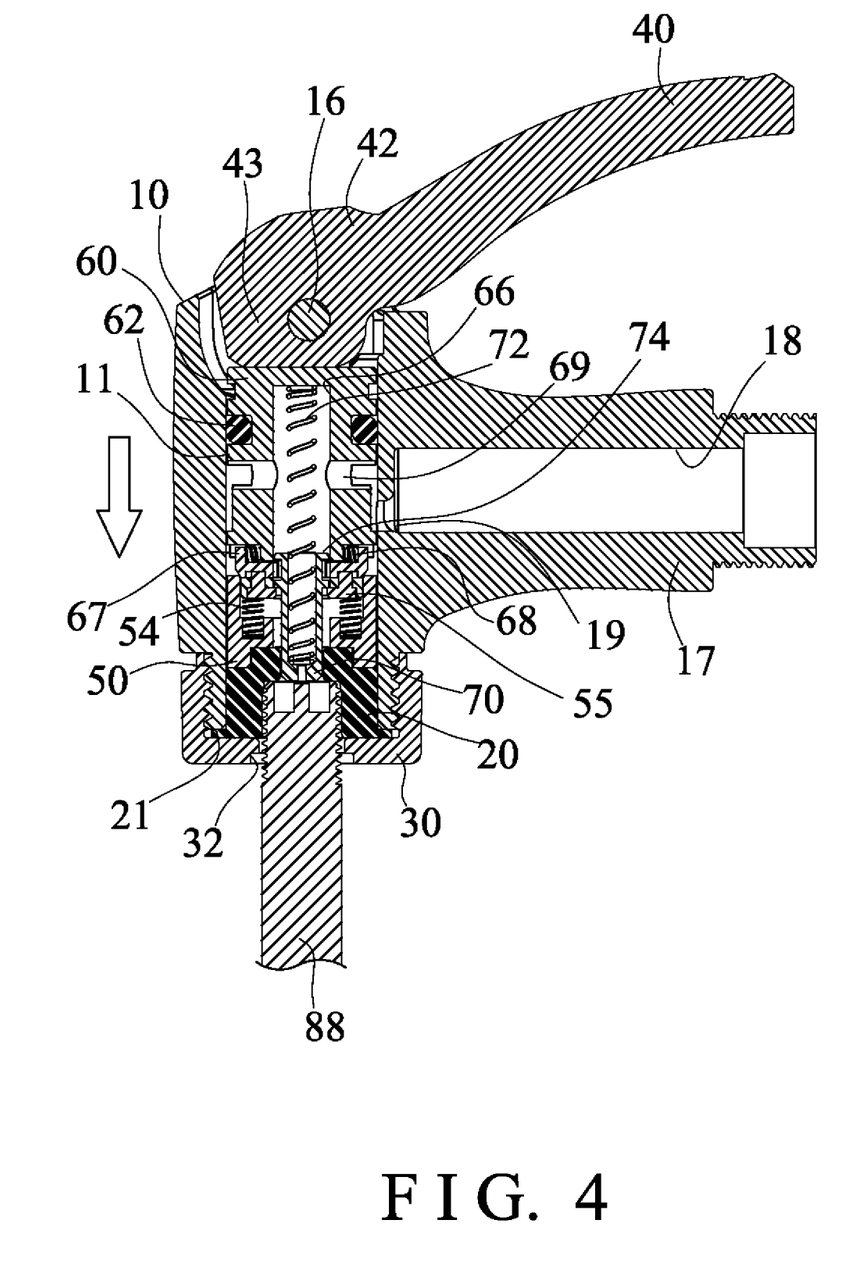
FIGS. 4, 5, 6 are other cross sectional views similar to FIG. 3, illustrating the operation of the air valve connecting device or attachment for engaging with one type of the nozzles or tire valves.
Figure 5:
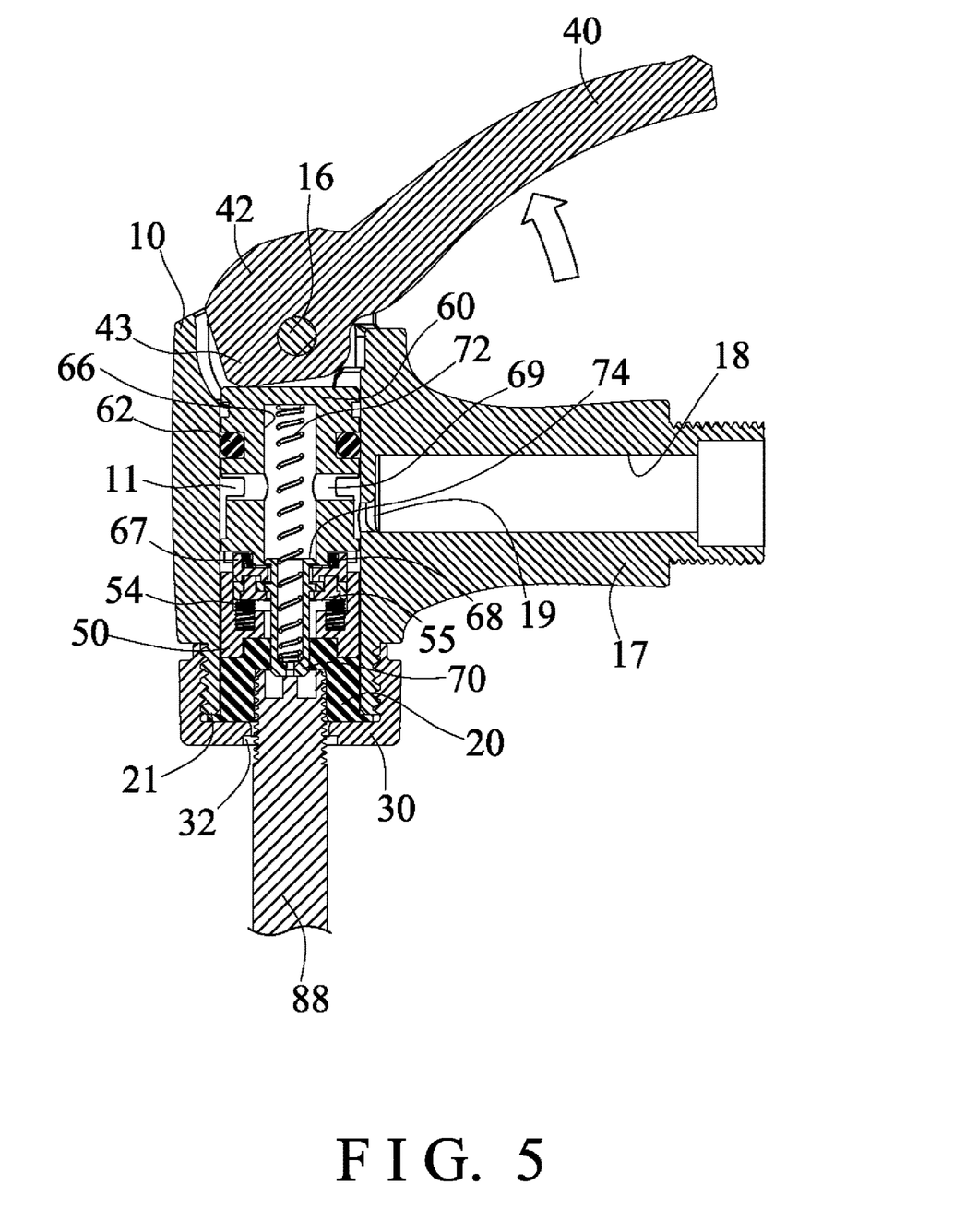
Figure 6:
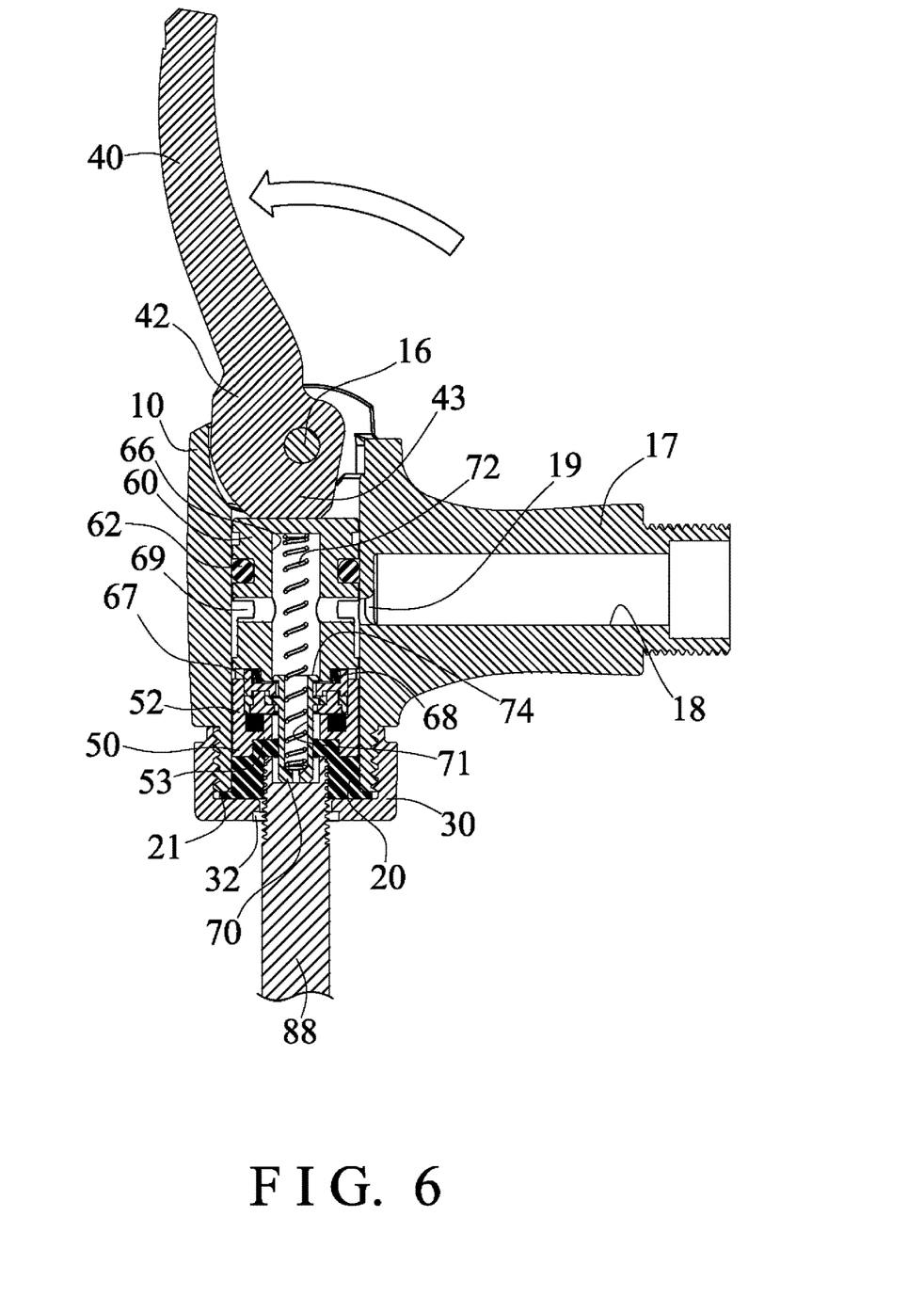

In operation, as shown in FIGS. 4-6, the shank 63 of the actuator 60 includes an outer diameter equal to or slightly smaller than or no greater than the inner diameter of the peripheral wall 52 and/or the space 51 of the barrel 50 for allowing the shank 63 of the actuator 60 to be selectively moved or partially engaged into the space 51 of the barrel 50, and for allowing the catches 67 to be selectively moved or engaged into the bore 66 of the actuator 60 by or with the peripheral wall 52 of the barrel 50 when the shank 63 of the actuator 60 is partially engaged into the space 51 of the barrel 50. One or more (such as two) spring biasing elements 68 are provided and engaged in the actuator 60, and contacted or engaged with the catches 67 respectively for biasing and forcing or disengaging or moving the catches 67 away from the bore 66 of the actuator 60 selectively when the shank 63 of the actuator 60 is selectively disengaged from the space 51 and the peripheral wall 52 of the barrel 50.

The actuator 60 includes a pathway 69 formed therein and communicating with the entrance 19 that is formed between the housing 10 and the casing 17 for allowing the pressurized air from the air pump (not shown) to flow through the entrance 19 of the housing 10 and to flow into the chamber 11 of the housing 10, and then to flow into the bore 66 of the actuator 60 selectively. A valve pressing member or tube 70 is slidably engaged in the bore 66 of the shank 63 or the actuator 60 for selectively engaging with the French type inflation valve 80 (FIGS. 7, 8), and is slidable or extendible into the compartment 24 of the mouth 20 for selectively engaging with the U.S. type inflation valve 88 (FIGS. 4-6), and includes a cavity 71 formed therein for receiving or engaging with another spring biasing member 72 which is engaged with the actuator 60 and/or engaged between the actuator 60 and the tube 70 for selectively biasing or forcing the tube 70 into the bore 23 of the stud 22 and/or the compartment 24 of the mouth 20 and for selectively engaging with either the U.S. type inflation valve 88 or the French type inflation valve 80.

The valve pressing tube 70 includes a peripheral recess 73 formed in the outer peripheral portion thereof and formed or defined by one or more (such as two) peripheral flanges or ribs 74 for selectively engaging with the catches 67 which may be moved to engage with the peripheral recess 73 of the tube 70 for solidly and stably anchoring or retaining the tube 70 to the actuator 60 when the shank 63 of the actuator 60 is engaged into the space 51 of the barrel 50 (FIGS. 5, 6). The disc 55 may be biased and forced by the spring biasing members 54 to slidably engage the projections 57 of the disc 55 with the catches 67 respectively in order to guide and limit the catches 67 to slide relative to the actuator 60 and for preventing the catches 67 from being disengaged from the actuator 60.

In operation, as shown in FIGS. 4-6, a U.S. type inflation valve 88 may be engaged through the opening 32 of the cover 30 and may be engaged into the compartment 24 of the mouth 20, and the tube 70 may be forced to engage with the U.S. type inflation valve 88 by the spring biasing member 72. The cam member 43 may then be forced to engage with the actuator 60 (FIG. 6) by rotating the actuating handle 40 relative to the actuator 60 and the housing 10 to the perpendicular working position, at this moment, the actuator 60 may be forced to move downwardly toward the barrel 50 and/or the mouth 20, and the catches 67 may be forced to move toward tube 70 in order to engage with the peripheral recess 73 of the tube 70 and so as to solidly and stably anchor or retain the tube 70 to the actuator 60 when the shank 63 of the actuator 60 is engaged into the space 51 of the barrel 50, and in order to solidly force the tube 70 to engage with the U.S. type inflation valve 88. The actuator 60 may also be forced to engage with the barrel 50 and the mouth 20 and to force the mouth 20 to solidly engage with and grasp the U.S. type inflation valve 88.

Figure 7:
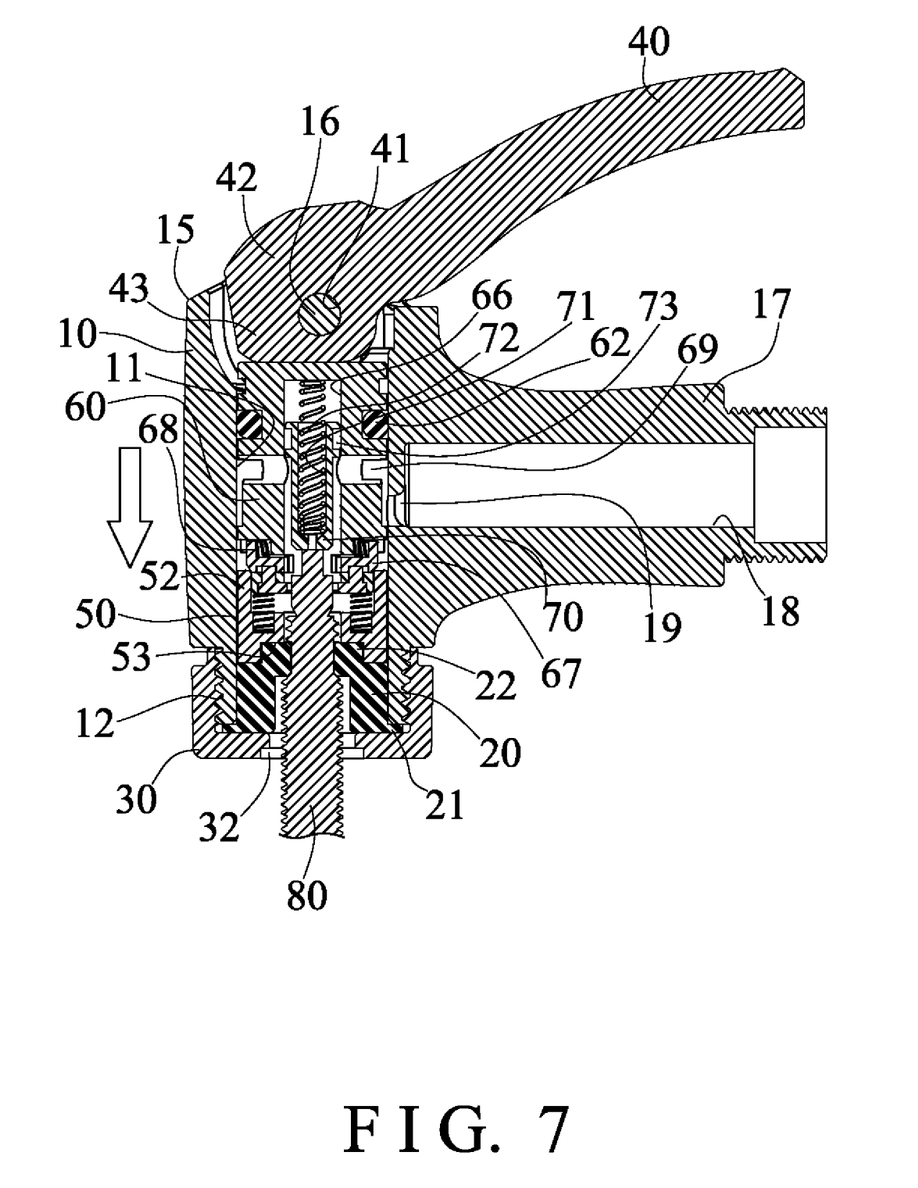
FIGS. 7, 8 are further cross sectional views illustrating the operation of the valve connecting device or attachment for engaging with different type of the nozzles or tire valves.
Figure 8:
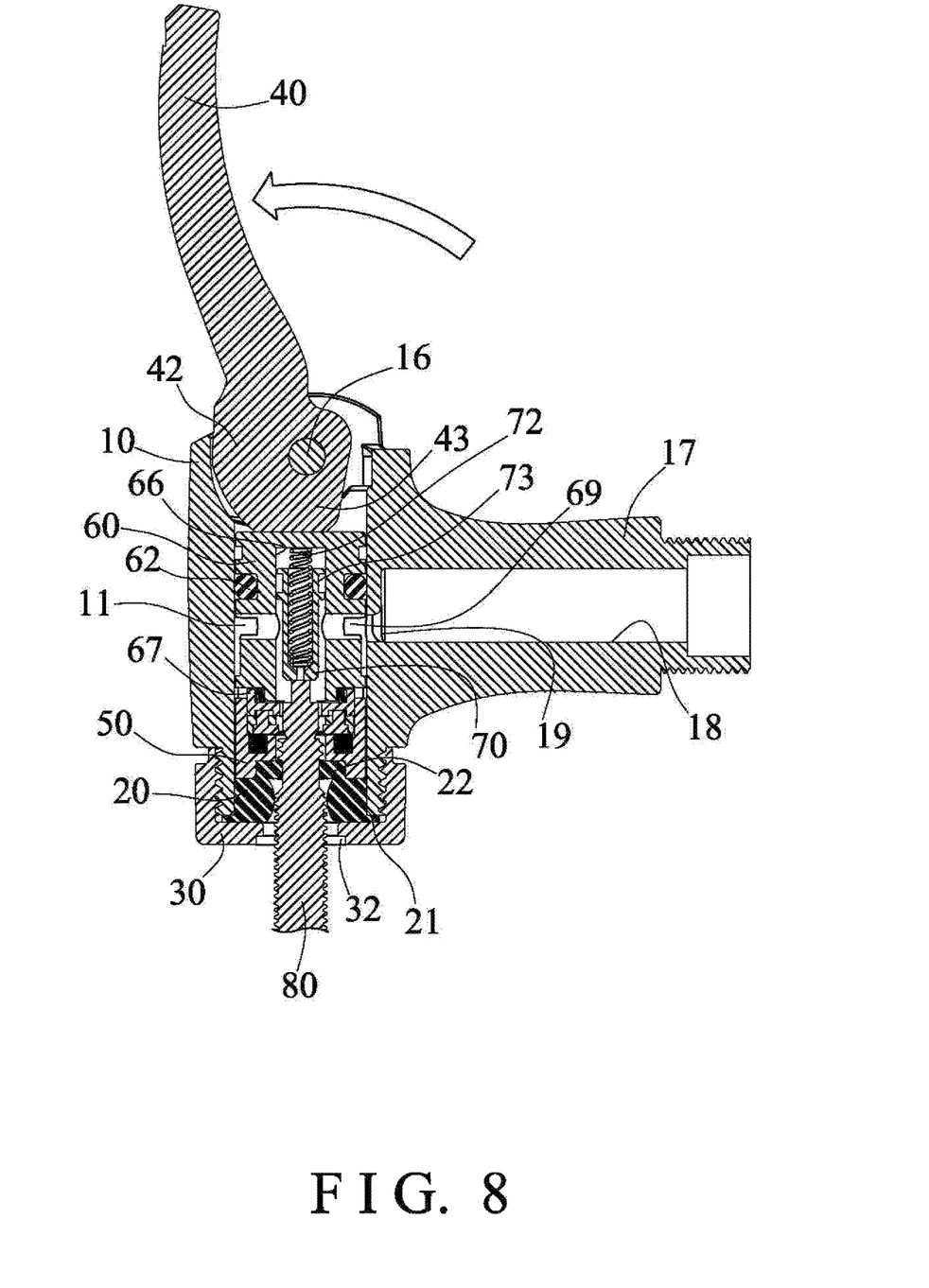

Alternatively, as shown in FIGS. 7 and 8, the French type inflation valve 80 may be engaged through the opening 32 of the cover 30 and may be engaged into the compartment 24 of the mouth 20 and may also be engaged into the bore 66 of the shank 63 or the actuator 60, and may force the tube 70 to engage with the spring biasing member 72. The cam member 43 may then be forced to engage with the actuator 60 by rotating the actuating handle 40 relative to the actuator 60 and the housing 10 to the perpendicular working position, at this moment, the actuator 60 may be forced to move downwardly toward the barrel 50 and/or the mouth 20, and to force the mouth 20 to solidly engage with and grasp the French type inflation valve 80 in order to solidly retain the French type inflation valve 80 to the actuator 60 and the housing 10.

Accordingly, the air valve connecting device or attachment in accordance with the invention includes an improved structure for easily and quickly connecting different inflation valves without changing the parts or elements or structure of the air valve connecting attachment.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
   a housing including a chamber formed in said housing, and including an entrance formed in said housing and communicating with said chamber of said housing for receiving a pressurized air,
   a grasping mouth engaged in a lower portion of said housing, and including a compartment formed in said mouth for engaging with either a first inflation valve or a second inflation valve,
   a barrel engaged into said chamber of said housing and engaged onto said mouth, said barrel including a space formed in said barrel and defined by a peripheral wall,
   an actuator slidably engaged in an upper portion of said housing and engageable with said barrel, and said actuator including a bore formed in said actuator, and including a groove laterally formed in said actuator and communicating with said bore of said actuator,
   a cam member pivotally attached to said housing and engageable with said actuator for selectively forcing said actuator and said barrel to compress said mouth to grasp either said first inflation valve or said second inflation valve to said housing,
   a tube slidably engaged in said bore of said actuator for selectively engaging with said second inflation valve, and extendible into said compartment of said mouth for selectively engaging with said first inflation valve, and
   at least one catch slidably received and engaged in said groove of said actuator and engageable into said bore of said actuator for selectively engaging with said tube and for selectively retaining said tube to said actuator.

2. The air valve connecting device as claimed in claim 1, wherein said peripheral wall of said barrel is provided for selectively engaging with and moving said at least one catch into said bore of said actuator and to engage with said tube.

3. The air valve connecting device as claimed in claim 2, wherein said actuator includes a shank having an outer diameter no greater than an inner diameter of said peripheral wall of said barrel for allowing said shank of said actuator to be selectively engaged into said space of said barrel, and for allowing said peripheral wall of said barrel to be selectively engaged with said at least one catch.

4. The air valve connecting device as claimed in claim 1, wherein said actuator includes a spring biasing element engaged with said at least one catch for biasing and moving s aid at least one catch away from said bore of said actuator when said actuator is disengaged from said peripheral wall of said barrel.

5. The air valve connecting device as claimed in claim 1, wherein said barrel includes a disc slidably engaged into said space of said barrel and having a projection extended from said disc for slidably engaging with said at least one catch and for guiding and limiting said at least one catch to slide relative to said actuator.

6. The air valve connecting device as claimed in claim 5, wherein said barrel includes at least one spring biasing member engaged with said disc for biasing said projection of said disc to engage with said at least one catch.

7. The air valve connecting device as claimed in claim 6, wherein said barrel includes a peripheral protrusion extended into said space of said barrel for engaging with said at least one spring biasing member.

8. The air valve connecting device as claimed in claim 1, wherein said tube includes a peripheral recess formed in an outer peripheral portion of said tube for selectively engaging with said at least one catch.

9. The air valve connecting device as claimed in claim 8, wherein said tube includes two peripheral ribs for forming said peripheral recess between said peripheral ribs of said tube.

10. The air valve connecting device as claimed in claim 1, wherein said tube includes a cavity formed in said tube for engaging with a spring biasing member which is engaged between said actuator and said tube for biasing said tube into said compartment of said mouth.

11. The air valve connecting device as claimed in claim 1, wherein said cam member is pivotally attached to said housing with an axle.

12. The air valve connecting device as claimed in claim 1, wherein said cam member includes a handle extended from said cam member.

* * * * *